(12) United States Patent  
Naito

(10) Patent No.: US 10,396,390 B2  
(45) Date of Patent: Aug. 27, 2019

(54) FUEL CELL STACK FOR VEHICLE

(71) Applicant: HONDA MOTOR CO., LTD., Tokyo (JP)

(72) Inventor: Hideharu Naito, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 201 days.

(21) Appl. No.: 15/438,761

(22) Filed: Feb. 22, 2017

(65) Prior Publication Data

US 2017/0244128 A1 Aug. 24, 2017

(30) Foreign Application Priority Data

Feb. 24, 2016 (JP) ................................ 2016-032844

(51) Int. Cl.
*H01M 8/2465* (2016.01)
*H01M 8/2475* (2016.01)
*H01M 8/1018* (2016.01)

(52) U.S. Cl.
CPC ....... *H01M 8/2465* (2013.01); *H01M 8/2475* (2013.01); *H01M 2008/1095* (2013.01); *H01M 2250/20* (2013.01); *Y02T 90/32* (2013.01)

(58) Field of Classification Search
CPC ............. H01M 8/2465; H01M 8/2475; H01M 2008/1095; H01M 2250/20; Y02T 90/32
See application file for complete search history.

(56) References Cited

U.S. PATENT DOCUMENTS

| | | | | |
|---|---|---|---|---|
| 2009/0286141 | A1* | 11/2009 | Nakamura | H01M 2/0212 429/82 |
| 2014/0322626 | A1* | 10/2014 | Naito | H01M 8/2475 429/467 |
| 2015/0270562 | A1* | 9/2015 | Naito | H01M 8/04201 429/458 |

FOREIGN PATENT DOCUMENTS

JP 2004-040950 2/2004

\* cited by examiner

*Primary Examiner* — Muhammad S Siddiquee
(74) *Attorney, Agent, or Firm* — Mori & Ward, LLP

(57) ABSTRACT

A fuel cell stack for a vehicle includes a stack body and a case. The stack body includes power generating cells to generate electric power via electrochemical reaction between fuel gas and oxidant gas. The power generating cells are stacked. The case houses the stack body therein and is mounted in the vehicle. The case includes a lower panel and an upper panel. The upper panel is provided above the lower panel in a height direction of the vehicle and has an inner surface opposite to the lower panel in the height direction. The stack body is provided between the upper panel and the lower panel. The upper panel includes a flow passage therein which extends along the inner surface of the upper panel and which communicates with an interior of the case and an exterior of the case.

12 Claims, 7 Drawing Sheets

FUEL CELL STACK FOR VEHICLE

CROSS-REFERENCE TO RELATED APPLICATIONS

The present application claims priority under 35 U.S.C. § 119 to Japanese Patent Application No. 2016-032844, filed Feb. 24, 2016. The contents of this application are incorporated herein by reference in their entirety.

BACKGROUND OF THE INVENTION

Field of the Invention

The present invention relates to a fuel cell stack for a vehicle.

Discussion of the Background

For example, a solid polymer type fuel cell has an electrolyte membrane and electrode structure (MEA) in which an anode electrode is arranged on one surface of the electrolyte membrane including a polymer ion exchange membrane and a cathode electrode is arranged on the other surface thereof, respectively. In the electrolyte membrane and electrode structure, a power generating cell (unit cell) is constituted by being sandwiched between separators. Generally, the predetermined number of the power generating cells is stacked thereby to be loaded on a fuel cell powered vehicle for example as a fuel cell stack for a vehicle.

In the fuel cell powered vehicle, there is a possibility that especially hydrogen of fuel gas leaks out in a space in which the fuel cell stack is loaded. Therefore, the fuel cell powered vehicle as disclosed in Japanese Patent Application Laid-Open Publication No. 2004-040950 is proposed on purpose to efficiently exhaust outwardly the hydrogen which leaks out from the fuel cell stack.

In this fuel cell powered vehicle, a closed space for loading the fuel cell thereon is arranged in front of a cabin. Then, as occasion demands, a first opening portion is provided in an upper part of the closed space and a second opening portion is provided in a position in which a negative pressure is generated at the time of travelling whereby to discharge the hydrogen leaking out from a fuel cell system into the closed space.

Accordingly, in the case where the opening portion is provided in the upper part of the closed space, the hydrogen leaking out from the fuel cell system within the closed space may be surely ventilated outside the vehicle especially in a stopping state of the vehicle. Moreover, in the case where the opening portion is provided in the negative pressure generating position, the hydrogen leaking out from the fuel cell system during traveling may be exhausted from the closed space.

SUMMARY OF THE INVENTION

According to one aspect of the present invention, a fuel cell stack for a vehicle includes a stack body in which a plurality of power generating cells configured to generate electric power by electrochemical reaction of fuel gas and oxidant gas are stacked. The stack body is housed in a stack casing and mounted within a vehicle.

The fuel cell stack is provided with an upper panel which constitutes an upper surface part of the stack casing. In addition, in an interior of the upper panel, a flow passage which provides communication between an interior of the stack casing and an exterior of the stack casing is formed inside and along an inner surface of the upper panel.

According to another aspect of the present invention, a fuel cell stack for a vehicle includes a stack body and a case. The stack body includes power generating cells to generate electric power via electrochemical reaction between fuel gas and oxidant gas. The power generating cells are stacked. The case houses the stack body therein and is mounted in the vehicle. The case includes a lower panel and an upper panel. The upper panel is provided above the lower panel in a height direction of the vehicle and has an inner surface opposite to the lower panel in the height direction. The stack body is provided between the upper panel and the lower panel. The upper panel includes a flow passage therein which extends along the inner surface of the upper panel and which communicates with an interior of the case and an exterior of the case.

BRIEF DESCRIPTION OF THE DRAWINGS

The embodiments will now be described with reference to the accompanying drawings, wherein like reference numerals designate corresponding or identical elements throughout the various drawings.

DESCRIPTION OF THE EMBODIMENTS

Figure 1:
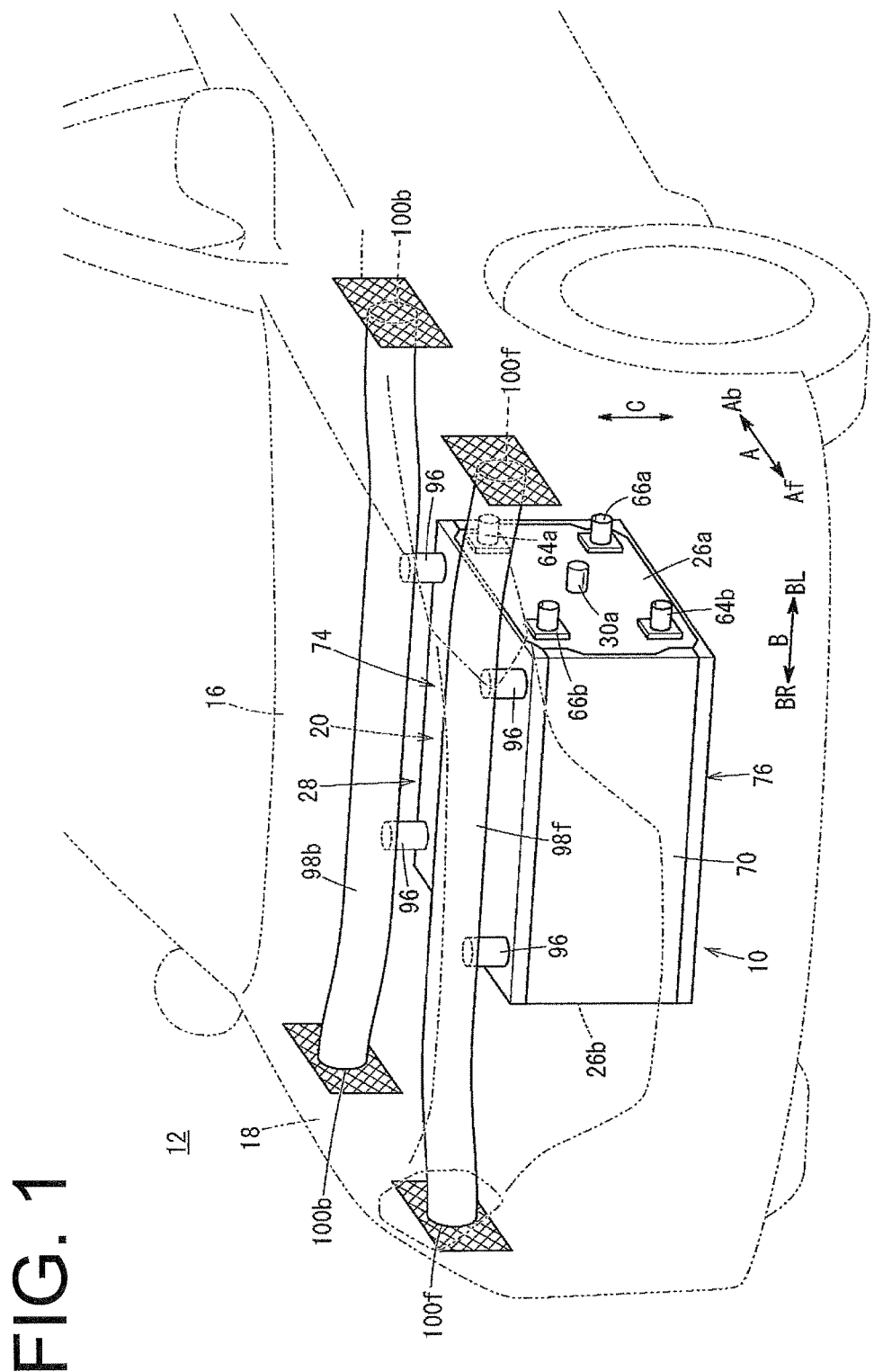
FIG. 1 is a schematic perspective view of a front part of a fuel cell powered vehicle on which a fuel cell stack in accordance with a first embodiment of the present invention is mounted.

The embodiments will now be described with reference to the accompanying drawings, wherein like reference numerals designate corresponding or identical elements throughout the various drawings.

Figure 2:
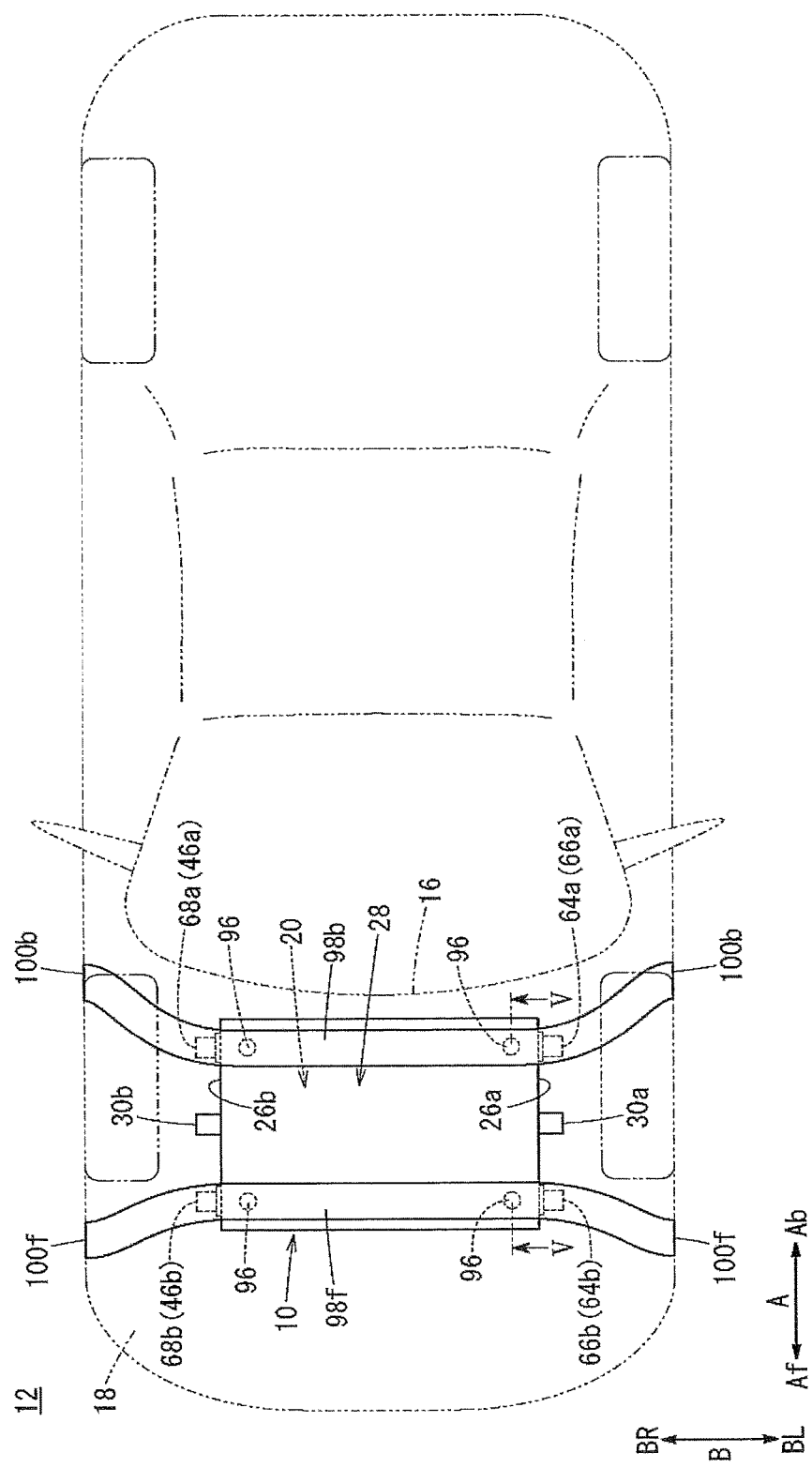
FIG. 2 is a schematic plan view of the fuel cell powered vehicle.

As shown in FIGS. 1 and 2, a fuel cell stack 10 according to a first embodiment of the present invention is mounted on a fuel cell powered vehicle 12 such as a fuel cell powered electric vehicle or the like, for example. The fuel cell powered vehicle 12 has the fuel cell stack 10 arranged in a front room (motor room) 18 which is formed in front of a dash board 16.

Figure 3:
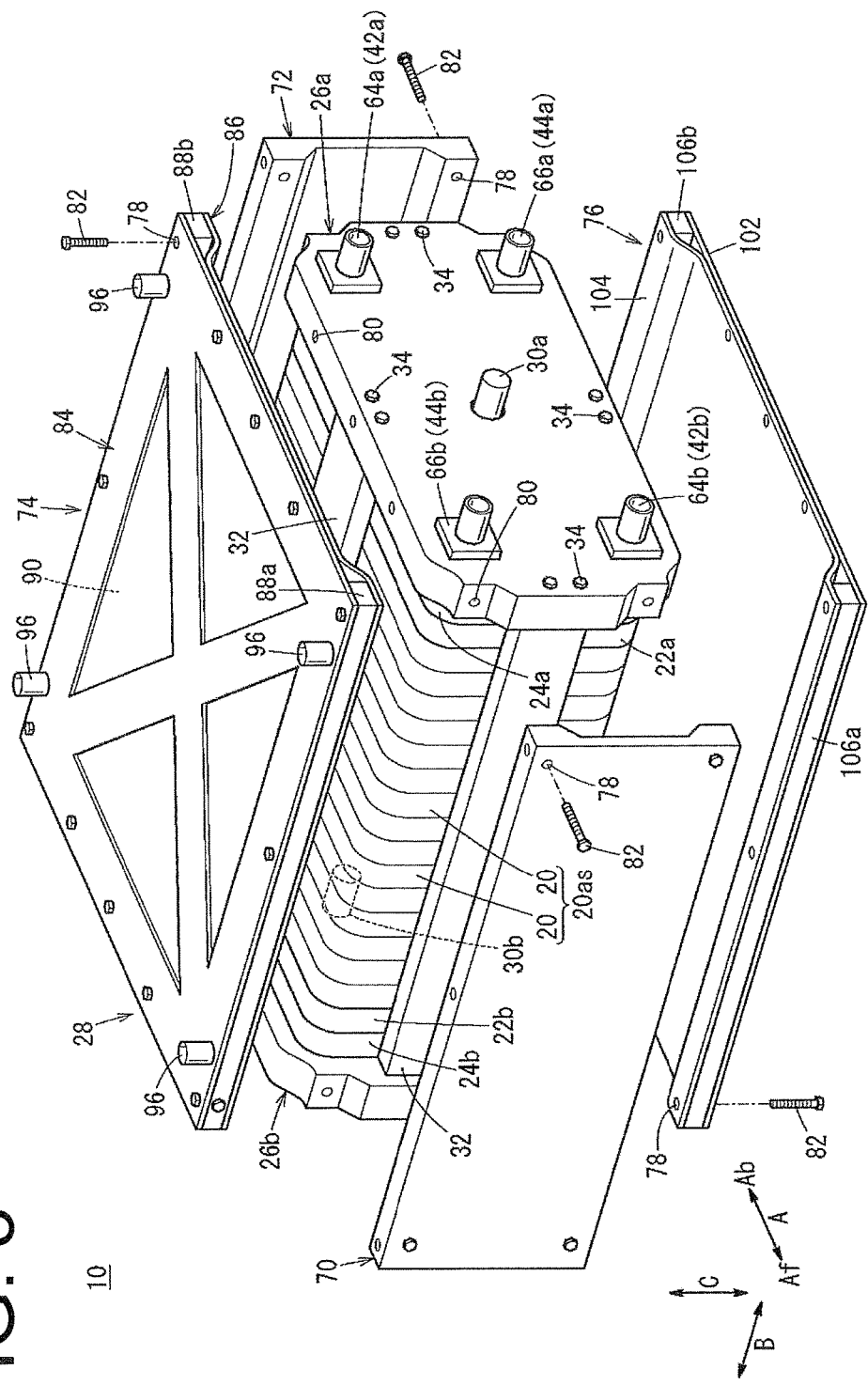
FIG. 3 is an exploded perspective view of a stack casing for housing the fuel cell stack.

As shown in FIG. 3, the fuel cell stack 10 is provided with a stack body 20as in which a plurality of power generating cells 20 are stacked in the vehicle width direction (in the direction of arrow B). At one end in the stacking direction of the power generating cells 20, a first terminal plate 22a, a first insulating plate 24a and a first end plate 26a are arranged in the order named toward outside.

At the other end in the stacking direction of the power generating cells 20, a second terminal plate 22b, a second insulating plate 24b and a second end plate 26b are arranged in the order named toward outside. The stack body 20as is housed in the stack casing 28 (the case 28) while using the first end plate 26a and the second end plate 26b as end plates. Herein, the stack casing 28 may be configured to provide separate plate members on each outside of the first end plate 26*a* and the second end plate 26*b*.

The first end plate 26*a* and the second end plate 26*b* are configured to be larger in external dimension than the power generating cells 20, the first insulating plate 24*a* and the second insulating plate 24*b*. The first terminal plate 22*a* may be accommodated in a recess of an interior of the first insulating plate 24*a*, while the second terminal plate 22*b* may be accommodated in a recess of an interior of the second insulating plate 24*b*.

A first power output terminal 30*a* which is connected to the first terminal plate 22*a* extends outwardly from a center part (or a position eccentric from the center part) of the first end plate 26*a* of horizontally long shape. A second power output terminal 30*b* which is connected to the second terminal plate 22*b* extends outwardly from a center part (or a position eccentric from the center part) of the second end plate 26*b* of horizontally long shape.

Between each side of the first end plate 26*a* and each side of the second end plate 26*b* there are arranged connecting bars 32 each of which has a prescribed length corresponding to a distance between center positions of each side. Both ends of the connecting bar 32 are fixedly secured by screws 34 so as to apply a fastening load to the stack body 20*as* in the stacking direction (in the direction of arrow B).

Figure 4:
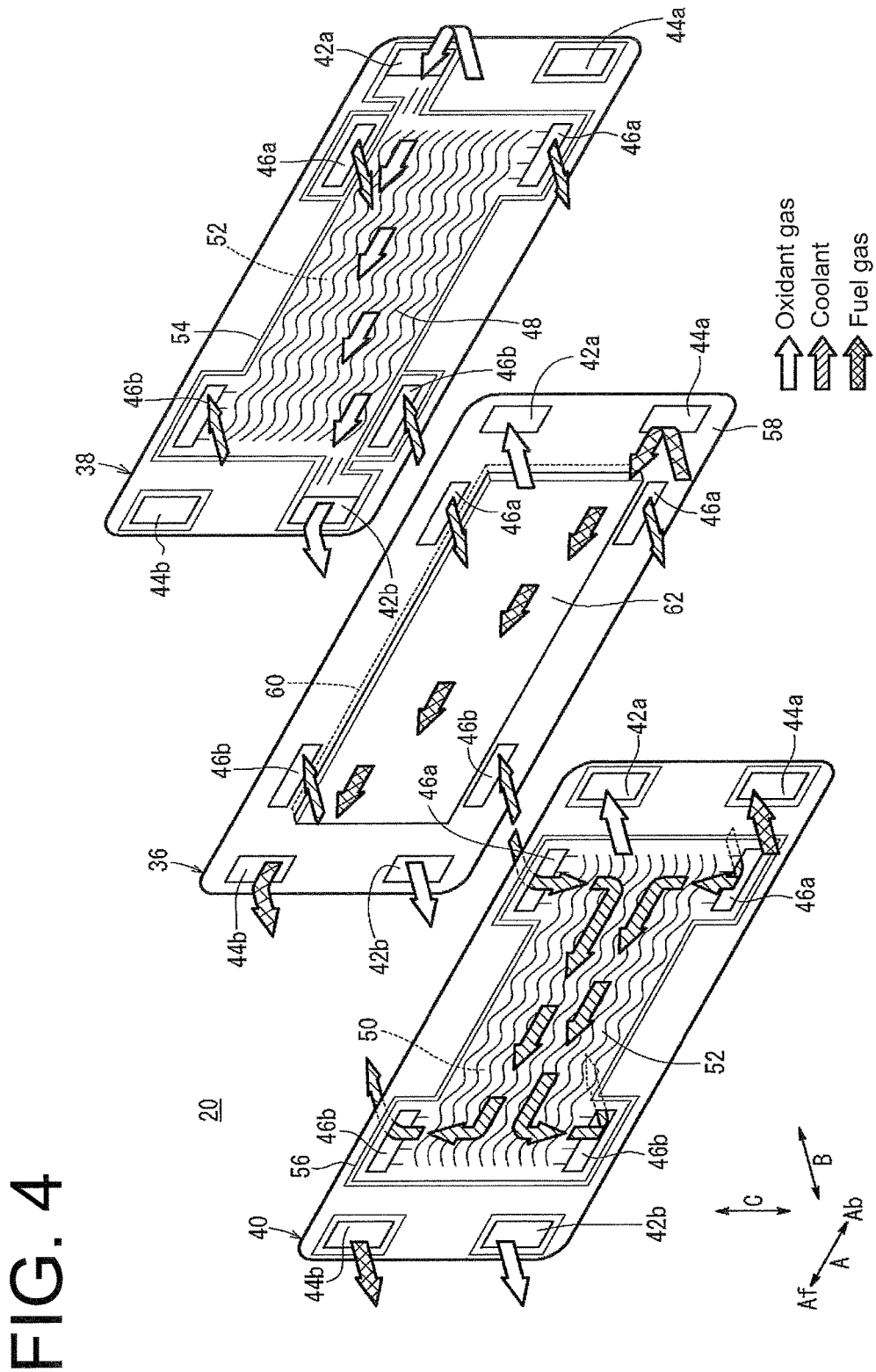
FIG. 4 is an exploded perspective view of an essential part of a power generating cell constituting the fuel cell stack.

As shown in FIG. 4, the power generating cell 20 is configured such that an electrolyte membrane and electrode structure 36 is held between a first separator 38 and a second separator 40. Four corners of the power generating cell 20 have, preferably, a curved shape (round shape) corresponding to a shape of each corner of the first end plate 26*a* and the second end plate 26*b*. The first separator 38 and the second separator 40 are formed by a metallic separator or a carbon separator.

In one end edge part in the direction of arrow A of the power generating cell 20, there are provided an oxidant gas inlet communicating port 42*a* and a fuel gas inlet communicating port 44*a* which are communicated separately in the stacking direction (in the direction of arrow B) respectively and arranged in the direction of arrow C (the vertical direction) in order. The oxidant gas inlet communicating port 42*a* supplies an oxidant gas such as an oxygen containing gas. The fuel gas inlet communicating port 44*a* supplies a fuel gas such as a hydrogen containing gas.

In the other end edge part in the direction of arrow A of the power generating cell 20, there are provided a fuel gas outlet communicating port 44*b* and an oxidant gas outlet communicating port 42*b* which are communicated separately in the direction of arrow B respectively and arranged in the direction of arrow C in order. The fuel gas outlet communicating port 44*b* discharges the fuel gas, and the oxidant gas outlet communicating port 42*b* discharges the oxidant gas.

In one end edge part in the direction of arrow C of the power generating cell 20, a pair of coolant inlet communicating ports 46*a* which is communicated separately in the direction of arrow B respectively is arranged on the upper and lower sides. The coolant inlet communicating port 46*a* supplies the coolant. In the other end edge part in the direction of arrow C of the power generating cell 20, a pair of coolant outlet communicating port 46*b* which is communicated separately in the direction of arrow B respectively is arranged on the upper and lower sides. The coolant outlet communicating port 46*b* discharges the coolant.

On a surface of the first separator 38 facing toward the electrolyte membrane and electrode structure 36, there is provided an oxidant gas flow passage 48 which communicates with the oxidant gas inlet communicating port 42*a* and the oxidant gas outlet communicating port 42*b*. On a surface of the second separator 40 facing toward the electrolyte membrane and electrode structure 36, there is provided a fuel gas flow passage 50 which communicates with the fuel gas inlet communicating port 44*a* and the fuel gas outlet communicating port 44*b*.

A coolant flow passage 52 which provides communication between the coolant inlet communicating port 46*a* and the coolant outlet communicating port 46*b* is provided between the first separator 38 and the second separator 40 which are located close to each other so as to constitute the power generating cell 20. A first sealing member 54 is provided integrally or separately on the first separator 38, while a second sealing member 56 is provided integrally or separately on second separator 40.

The electrolyte membrane and electrode structure 36 includes a solid polymer electrolyte membrane (cation exchange membrane) 58 which is, for example, a perfluorosulfonic acid membrane containing water, a cathode electrode 60 and an anode electrode which sandwich the solid polymer electrolyte membrane 58 therebetween. The cathode electrode 60 and the anode electrode 62 have a gas diffusion layer formed of a carbon paper or the like and an electrode catalyst layer which is formed by evenly applying porous carbon particles carrying a platinum alloy on a surface thereof, to a surface of the gas diffusion layer. The electrode catalyst layer is formed on each surface of the solid polymer electrolyte membrane 58.

As shown in FIG. 3, in one of diagonal positions of the first endplate 26*a*, there are provided an oxidant gas supply manifold 64*a* communicating with the oxidant gas inlet communicating port 42*a* and an oxidant gas exhaust manifold 64*b* communicating with the oxidant gas outlet communicating port 42*b*. In the other of the diagonal positions of the first end plate 26*a*, there are provided a fuel gas supply manifold 66*a* communicating with the fuel gas inlet communicating port 44*a* and a fuel gas exhaust manifold 66*b* communicating with the fuel gas outlet communicating port 44*b*.

As shown in FIG. 2, in the second end plate 26*b*, there are provided a coolant supply manifold 68*a* communicating with the coolant inlet communicating port 46*a* and a coolant exhaust manifold 68*b* communicating with the coolant outlet communicating port 46*b*.

As shown in FIG. 3, the stack casing 28 includes a front side panel 70, a rear side panel 72, an upper panel 74, a lower panel 76, the first end plate 26*a* and the second end plate 26*b*. Component parts constituting the stack casing 28 are fixedly secured to each other and to the first end plate 26*a* and the second end plate 26*b* by screws 82 which are screw-threaded into tapped holes 80 through hole portions 78.

The front side panel 70 and the rear side panel 72 are formed for example by extrusion molding, casting, machining or the like. The front side panel 70 and the rear side panel 72 have a horizontally long plate shape to be arranged in the vertical direction, and an upper part and a lower part thereof are protruded inwardly of the stack casing 28.

Figure 5:
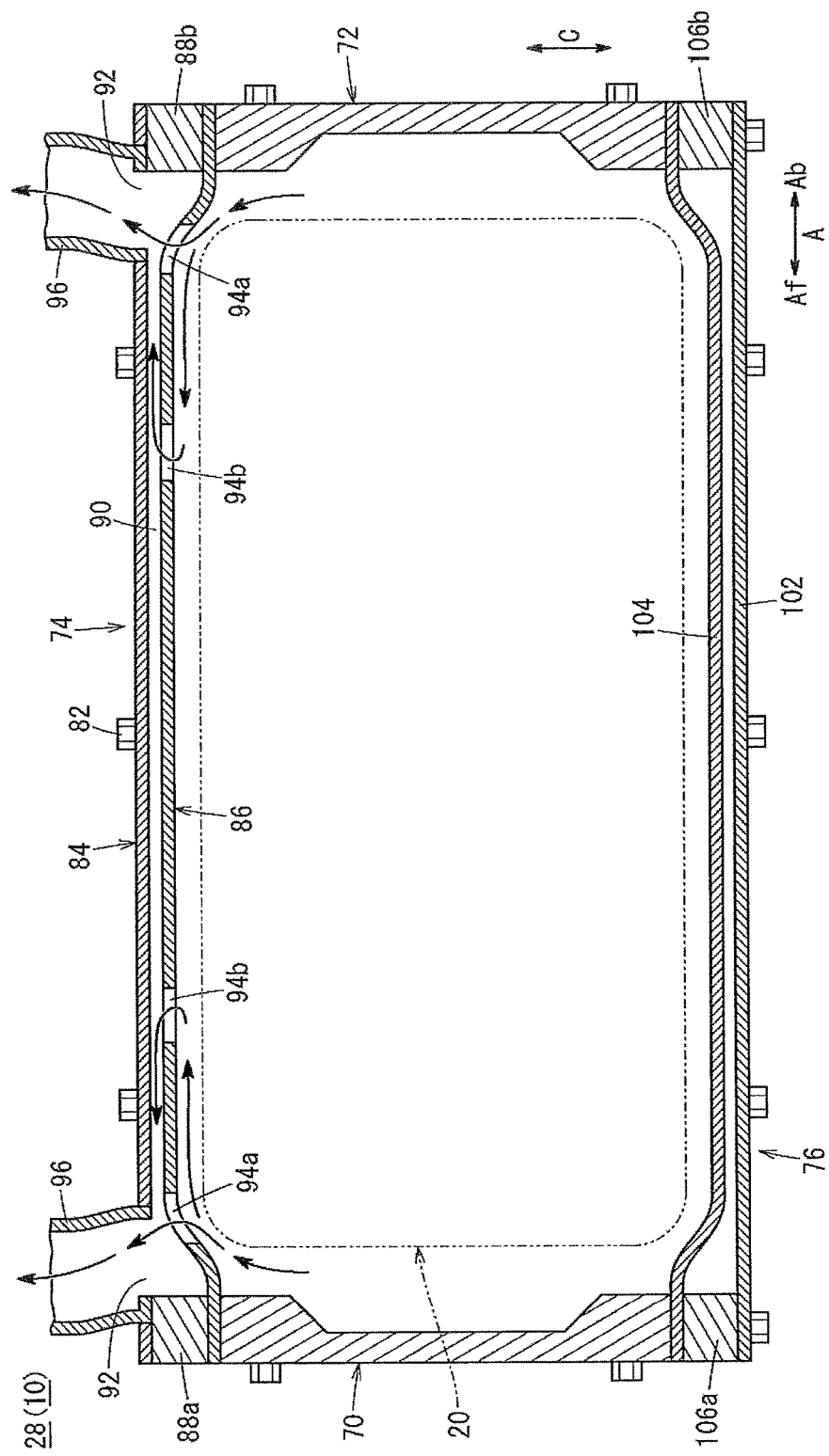
FIG. 5 is a cross sectional view of the fuel cell stack taken on line V-V of FIG. 2.
Figure 6:
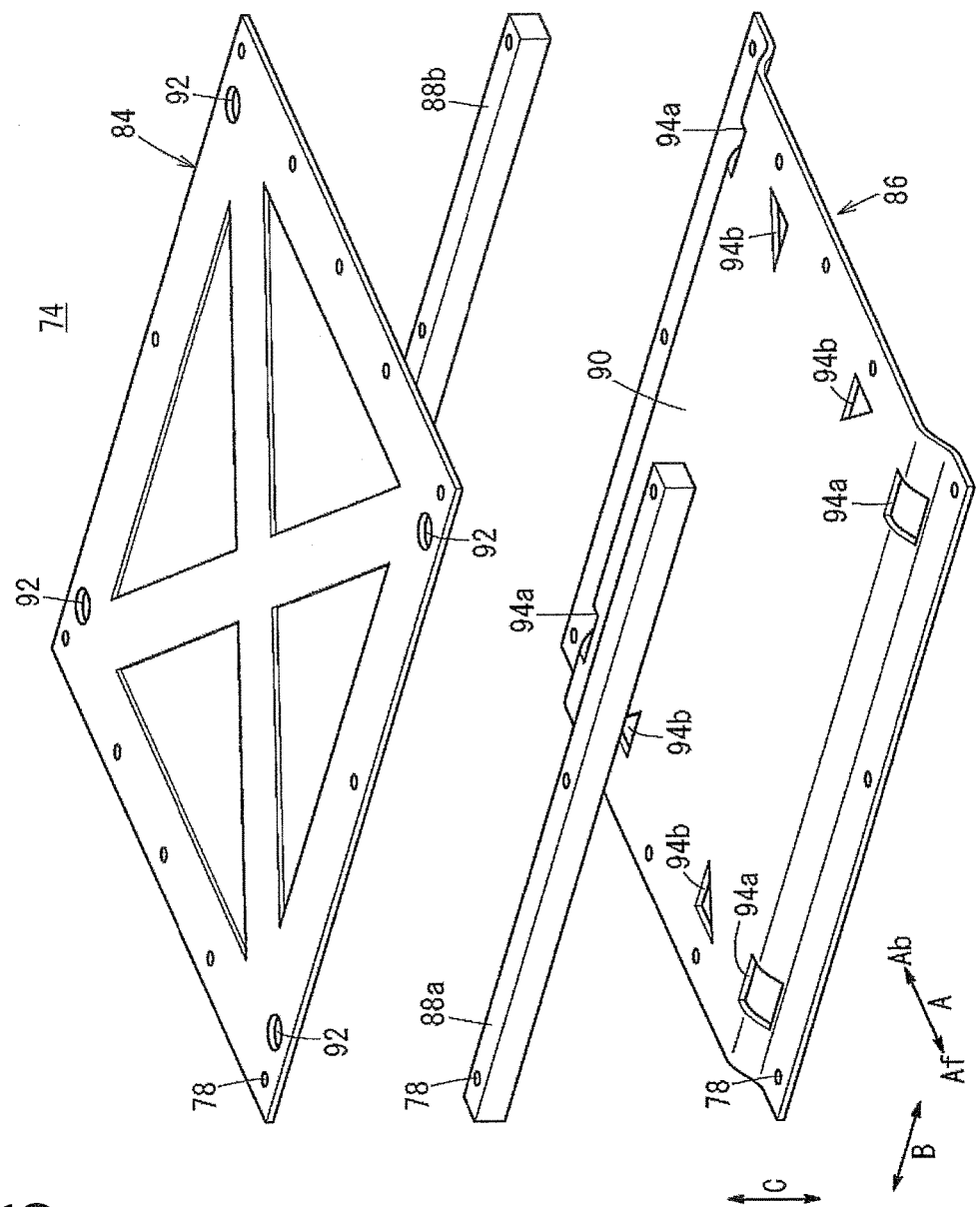
FIG. 6 is an exploded perspective view of an upper panel constituting the stack casing.

The upper panel 74 constituting an upper surface part of the stack casing 28, as shown in FIGS. 3, 5 and 6, is provided with an outer plate 84 and an inner plate 86 including a pair of press plates (press molding plates) to be joined to each other. The outer plate 84 and the inner plate 86 are formed by a thin metal plate whose surface is press molded into uneven shape. Flat plate members 88*a*, 88*b* are fitted into between the outer plate 84 and the inner plate 86 at both plate ends (both ends in the direction of arrow A) which extend in the stacking direction (in the direction of arrow B).

The outer plate 84 constitutes an upper surface of the stack casing 28 and is formed in a thin plate shape. The inner plate 86 constitutes an inner peripheral surface of the stack casing 28 and is formed in a thin plate shape and has a curved shape, a bent shape, or either of them along an outer peripheral shape of the power generating cell 20.

The flat plate members 88a, 88b are of substantially long square bar extending in the direction of arrow B and are formed thicker than the outer plate 84 and the inner plate 86. The flat plate members 88a, 88b are fixedly secured to the outer plate 84 and the inner plate 86 by MIG welding or TIG welding (spot welding, brazing, friction stir welding or the like may be applied). The outer plate 84 and the inner plate 86 are fixedly secured to each other by welding, etc. The hole portions 78 for inserting bolts are formed in the prescribed positions on the outer plate 84, the inner plate 86 and the flat plate members 88a, 88b.

In the interior of the upper panel 74, an exhaust flow passage 90 which communicates with an interior of the stack casing 28 and an exterior of the stack casing 28 is formed between the outer plate 84 and the inner plate 86 inside and along an inside surface of the upper panel. Herein, the upper panel 74 may be constituted by three or more press plates and may be integrally formed by casting by using a core.

As shown in FIG. 6, in the outer plate 84 constituting the upper surface of the upper panel 74, outside opening portions 92 connected to the exterior of the upper panel 74 are provided in at least two positions, in four positions corresponding to four corners in the first embodiment.

In the inner plate 86 constituting the lower surface of the upper panel 74, inside opening portions 94a, 94b connected to the interior of the stack casing 28 are provided in at least two positions each, in four positions each in the first embodiment. The inside opening portions 94a are arranged corresponding to the four corners of the inner plate 86 and located closer to the center side of the stack body 20as than the outside opening portions 92. The inside opening portions 94b are located closer to the center side of the stack body 20as than the inside opening portions 94a.

The inside opening portion 94b are formed in a triangular shape, but not limited to this. They may employ various forms such as a square shape, a circular shape, etc. The outside opening portions 92 and the inside opening portions 94a may employ various shape such as a square shape, a triangular shape, a circular shape, etc. Further, the inside opening portions 94a, 94b may be provided in various places where the fuel gas is easy to be collected.

The inside opening portions 94a, 94b communicate with the interior of the stack casing 28 and the exhaust flow passage 90. The outside opening portions 92 each communicate with the exhaust flow passages 90 and are connected to duct members 96. As shown in FIGS. 1 and 2, the two duct members 96 of the stack casing 28 located on the front side of the vehicle are integrally connected to a front exhaust duct 98f. The two duct members 96 on the rear side of the vehicle, of the stack casing 28 are integrally connected to a rear exhaust duct 98b.

The front exhaust duct 98f extends to both sides in the vehicle width direction (in the direction of arrow B) of the fuel cell powered vehicle 12 along the upper side of the stack casing 28 and is connected to each of vehicle front side exhaust ports 100f located on lateral sides of the vehicle. The rear exhaust duct 98b extends to both sides in the vehicle width direction (in the direction of arrow B) of the fuel cell powered vehicle 12 along the upper side of the stack casing 28 and is connected to each of vehicle rear side exhaust ports 100b located on the lateral sides of the vehicle.

As shown in FIGS. 3 and 5, the upper panel 76 constituting a lower surface part of the stack casing 28 is provided with an outer plate 102 and an inner plate 104 including at least a pair of press plates (press molding plates) to be joined to each other. The outer plate 102 and the inner plate 104 are formed by a thin metal plate whose surface is press molded into uneven shape. Flat plate members 106a, 106b are fitted into between the outer plate 102 and the inner plate 104 at both plate ends (both ends in the direction of arrow A) which extend in the stacking direction (in the direction of arrow B).

The flat plate members 106a, 106b are of substantially long square bar extending in the direction of arrow B and are formed thicker than the outer plate 102 and the inner plate 104. The outer plate 102, the inner plate 104 and the flat plates 106a, 106b are fixedly secured in the same way as the upper panel 74.

The operation of the fuel cell powered vehicle 12 configured as above will be explained hereunder.

First, when driving the fuel cell powered vehicle 12, as shown in FIG. 3, the fuel gas such as hydrogen containing gas (for example, hydrogen gas) and the like is supplied from the fuel gas supply manifold 66a of the first endplate 26a to the fuel gas inlet communicating port 44a. On the other hand, the oxidant gas (for example, air) and the like is supplied from the oxidant gas supply manifold 64a of the first end plate 26a to the oxidant gas inlet communicating port 42a.

As shown in FIG. 4, the fuel gas is introduced from the fuel gas inlet communicating port 44a to the fuel gas flow passage 50 of the second separator 40. This fuel gas circulates in the direction of the arrow A thereby to be supplied to the anode electrode 62 constituting the electrolyte membrane and electrode structure 36. The oxidant gas is introduced from the oxidant gas inlet communicating port 42a to the oxidant gas flow passage 48 of the first separator 38. The oxidant gas circulates in the direction of the arrow A thereby to be supplied to the cathode electrode 60 constituting the electrolyte membrane and electrode structure 36.

Accordingly, in the electrolyte membrane and electrode structure 36, the fuel gas supplied to the anode electrode 62 and the oxidant gas supplied to the cathode electrode 60 are consumed within the electrode catalyst layer by the electrochemical reaction, so that electricity is generated.

The fuel gas, as shown in FIG. 3, is discharged from the fuel gas outlet communicating port 44b to the fuel gas exhaust manifold 66b of the first endplate 26a. The oxidant gas is discharged from the oxidant gas outlet communicating port 42b to the oxidant gas exhaust manifold 64b of the first end plate 26a.

Further, the coolant such as pure water, ethylene glycol, oil and the like, as shown in FIG. 2, is supplied from the coolant supply manifold 68a of the second end plate 26b to the coolant inlet communicating port 46a. As shown in FIG. 4, the coolant supplied to the pair of coolant inlet communicating ports 46a is introduced into the coolant flow passage 52 between the mutually neighboring first separator 38 and second separator 40. The coolant, after having flown inwardly in the direction arrow C, moves in the direction of arrow A so as to cool the electrolyte membrane and electrode structure 36. This coolant, after having moved outwardly in the direction of arrow C, flows through the pair of coolant outlet communicating ports 46b and is discharged into the coolant exhaust manifold 68b (see FIG. 2).

In this case, in the first embodiment, as shown in FIGS. 5 and 6, the exhaust flow passage 90 which communicates with the inside of the stack casing 28 and the outside of the stack casing 28 is formed inside and along the inside surface of the upper panel in the interior of the upper panel 74. Then, since the fuel gas, for example, hydrogen which leaks out from the fuel cell stack 10 is lighter than air, it rises up within the stack casing 28. The fuel gas (hydrogen) rising upward within the stack casing 28 flows into the exhaust flow passage 90 through each of the inside opening portions 94a, 94b of the inner plate 86 constituting the upper panel 74.

The fuel gas flowing along the exhaust flow passage 90 is discharged into the duct member 96 from each of the outside opening portions 92 of the outer plate 84 constituting the upper panel 74. As shown in FIGS. 1 and 2, the front exhaust duct 98f is integrally connected to the two duct members 96 located on the front side of the vehicle, and the rear exhaust duct 98b is integrally connected to the two duct members 96 located on the rear side of the vehicle.

Therefore, the fuel gas discharged from the duct member 96 into the front exhaust duct 98f is exhausted outwardly of the vehicle from each of the vehicle front side exhaust ports 100f located on the vehicle lateral sides of the fuel cell powered vehicle 12. On the other hand, the fuel gas discharged from the duct member 96 into the rear exhaust duct 98b is exhausted outwardly of the vehicle from each of the vehicle rear side exhaust ports 100b located on the vehicle lateral sides of the fuel cell powered vehicle 12.

Further, in the upper panel 74, the inside opening portions 94a are arranged closer to the center side of the stack body 20as than the outside opening portions 92, and the inside opening portions 94b are arranged closer to the center side of the stack body than the inside opening portions 94a. Accordingly, the fuel gas rising up within the stack casing 28, after having been mixed and diluted through the inside opening portions 94a, 94b, can smoothly and surely circulate into the exhaust flow passage 90.

Further, the upper panel 74 is formed with the four outside opening portions 92, corresponding to two diagonal positions of the upper panel, which are configured to communicate the interior of the stack casing 28 to the outside. In addition, one ends of the duct members 96 are connected to each of the outside opening portions 92, while the other ends of the duct members 96 are open to the outside through the front exhaust duct 98f or the rear exhaust duct 98b. Accordingly, even if the fuel cell powered vehicle 12 is inclined in the forward and backward direction or in the right and left direction, the fuel gas can be discharged from any one of the four outside opening portions 92 at the least.

Therefore, in the first embodiment, such an effect that, with a simple configuration, the fuel gas leaking out into the stack casing 28 can be easily and surely exhausted is obtained.

Figure 7:
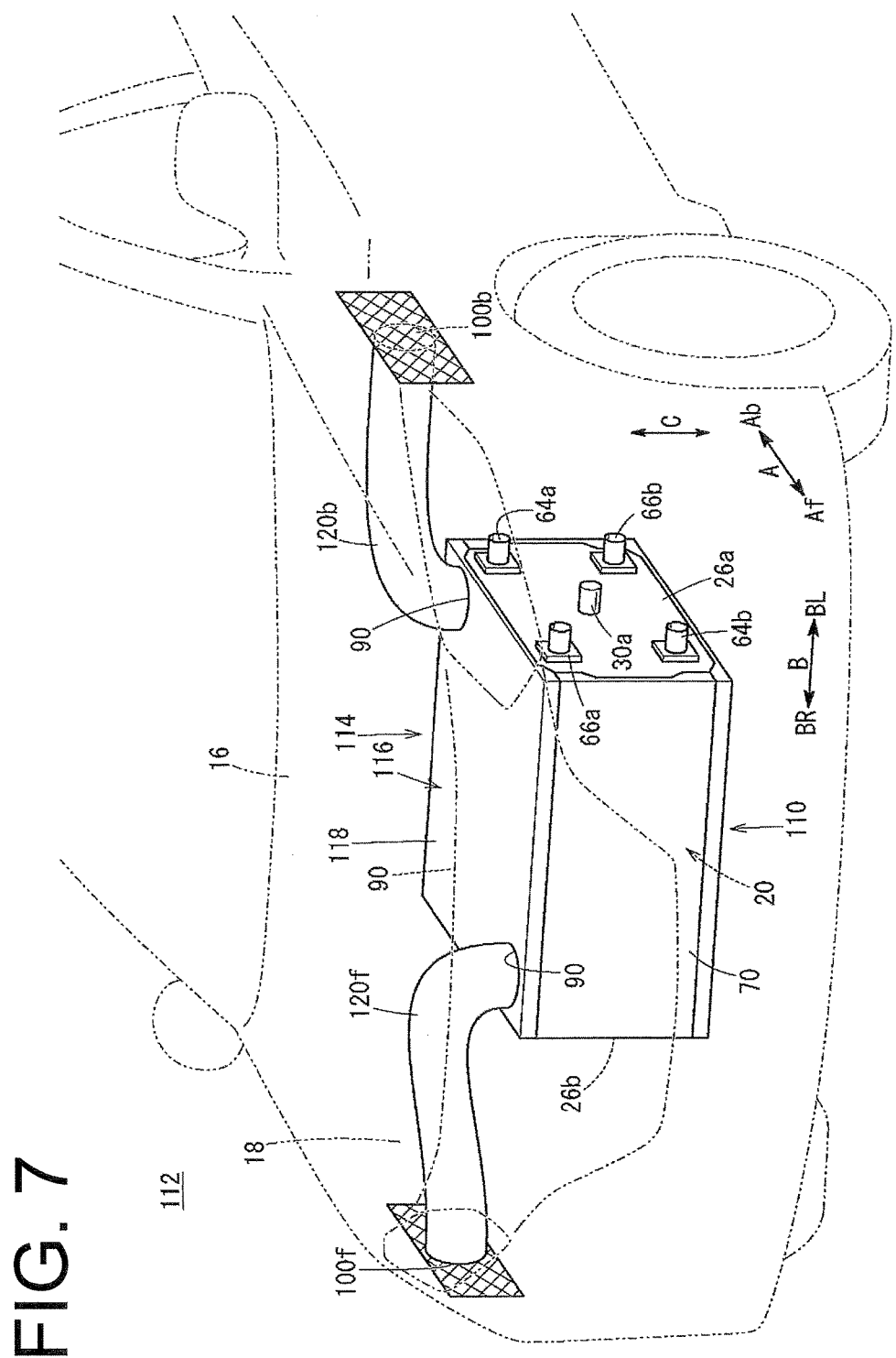
FIG. 7 is a schematic perspective view of the front part of the fuel cell powered vehicle on which the fuel cell stack in accordance with a second embodiment of the present invention is mounted.

FIG. 7 is a schematic perspective view of a front part of the fuel cell powered vehicle 112 on which a fuel cell stack 110 in accordance with a second embodiment of the present invention is mounted. Herein, component elements identical to the fuel cell stack 10 of the first embodiment are given like reference characters, and detailed explanation thereof will be omitted.

The fuel cell stack 110 is provided with a stack casing 114 in which a plurality of power generating cells 20 are housed. The stack casing 114 includes an upper panel 116, and the upper panel 116 constitutes an upper surface part of the stack casing 114.

An outer plate 118 constituting an upper surface of the upper panel 116 is formed with the outside opening portions 92 which communicate the exhaust flow passage 90 within the stack casing 114 to the outside. The outside opening portions are located in one of diagonal positions of the outer plate. In the second embodiment, the outside opening portions 92 are provided in two positions of the outer plate 118.

One end of a front exhaust duct 120f is connected to the outside opening portion 92 on the front side, and the other end of the front exhaust duct 120f is connected to the vehicle front side exhaust port 100f. One end of a rear exhaust duct 120b is connected to the outside opening portion 92 on the rear side, and the other end of the rear exhaust duct 120b is connected to the vehicle rear side exhaust port 100b.

In the second embodiment configured like this, the upper panel 116 constituting the upper surface of the stack casing 114 is formed with the two outside opening portions 92, corresponding to one of the diagonal positions of the upper panel, which communicate the exhaust flow passage 90 within the stack casing 114 to the outside. In addition, one ends of the front exhaust duct 120f and the rear exhaust duct 120b are connected to the outside opening portions 92, and the other ends of the front exhaust duct 120f and the rear exhaust duct 120b are open to the outside.

Therefore, in the second embodiment, such similar effect to the first embodiment that, with a simple configuration, the fuel gas leaking out into the stack casing 114 can be easily and surely exhausted is obtained.

DESCRIPTION OF REFERENCE CHARACTERS 10, 110: Fuel cell stack, 12, 112: Fuel cell powered vehicle, 20: Power generating cell, 20as: Stack body, 26a, 26b: End plate, 28, 114: Stack casing, 36: Electrolyte membrane and electrode structure, 38, 40: Separator, 42a: Oxidant gas inlet communicating port, 42b: Oxidant gas outlet communicating port, 44a: Fuel gas inlet communicating port, 44b: Fuel gas outlet communicating port, 46a: Coolant inlet communicating port, 46b: Coolant outlet communicating port, 48: Oxidant gas flow passage, 50: Fuel gas flow passage, 52: Coolant flow passage, 58: Solid polymer electrolyte membrane, 60: Cathode electrode, 62: Anode electrode, 70: Front side panel, 72: Rear side panel, 74,116: Upper panel, 76: Lower panel, 84, 102,118: Outer plate, 86, 104: Inner plate, 88a, 88b: Flat plate member, 90: Exhaust flow passage, 92: Outside opening portion, 94a, 94b: Inside opening portion, 96: Duct member, 98f, 120f: Front exhaust duct, 98b, 120b: Rear exhaust duct A fuel cell stack for a vehicle according to embodiments of the present invention includes a stack body in which a plurality of power generating cells configured to generate electric power by electrochemical reaction of fuel gas and oxidant gas are stacked. The stack body is housed in a stack casing and mounted within a vehicle.

The fuel cell stack is provided with an upper panel which constitutes an upper surface part of the stack casing. In addition, in an interior of the upper panel, a flow passage which provides communication between an interior of the stack casing and an exterior of the stack casing is formed inside and along an inner surface of the upper panel.

Further, it is preferable that the upper panel has at least an outer plate arranged on an outside of the stack casing and an inner plate arranged on an inside of the stack casing, and a flow passage is formed between the outer plate and inner plate.

Further, it is preferable that an outside opening portion connected to an exterior of the upper panel is provided in at least two positions on an upper surface of the upper panel, and a duct member is connected to the outside opening portion.

Furthermore, it is preferable that an inside opening portion connected to the interior of the stack casing is provided on a lower surface of the upper panel, and the inside opening portion is located closer to a center side of the stack body than the outside opening portion.

According to the embodiments of the present invention, in the interior of the upper panel, the flow passage which provides communication between the interior of the stack casing and the exterior of the stack casing is formed inside and along the inner surface of the upper panel. Therefore, the fuel gas rising upward within the stack casing flows through the interior of the upper panel and, thereafter, is smoothly exhausted outwardly of the stack casing. Accordingly, with a simple configuration, the fuel gas leaking out into the stack casing can be easily and surely exhausted.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell stack for a vehicle, comprising:
a stack body in which a plurality of power generating cells configured to generate electric power by electrochemical reaction of fuel gas and oxidant gas are stacked; and
a stack casing housing the stack body and mounted within a vehicle, the stack casing comprising:
an upper panel which constitutes an upper surface part of the stack casing, the upper panel including:
an outer plate; and
an inner plate arranged between the outer plate and the stack body in a height direction along a height of the vehicle to constitute a flow passage between the outer plate and the inner plate such that the flow passage communicates with an interior of the stack casing and an exterior of the stack casing.

2. The fuel cell stack according to claim 1, wherein the flow passage extends along the inner plate.

3. The fuel cell stack according to claim 1, wherein the outer plate of the upper panel further comprises outside opening portions connected to the exterior of the stack casing in at least two positions on an upper surface of the outer plate,
the fuel cell stack further comprising at least one duct member connected to the outside opening portions.

4. The fuel cell stack according to claim 3, further comprising an inside opening portion through which the flow passage communicates with the interior of the stack casing, wherein the inside opening portion is located closer to a center side of the stack body than at least one of the outside opening portions.

5. A fuel cell stack for a vehicle, comprising:
a stack body comprising power generating cells to generate electric power via electrochemical reaction between fuel gas and oxidant gas, the power generating cells being stacked; and
a case housing the stack body therein and mounted in the vehicle, the case comprising:
a lower panel; and
an upper panel provided above the lower panel in a height direction along a height of the vehicle such that the stack body is provided between the upper panel and the lower panel, the upper panel including:
an outer plate; and
an inner plate arranged between the outer plate and the stack body in the height direction to constitute a flow passage between the outer plate and the inner plate such that the flow passage communicates with an interior of the case and an exterior of the case.

6. The fuel cell stack according to claim 5, wherein the flow passage extends along the inner plate.

7. The fuel cell stack according to claim 5, wherein the outer plate of the upper panel further comprises outside opening portions provided at at least two positions on an upper surface of the outer plate to connect the flow passage and the exterior of the case,
the fuel cell stack further comprising at least one duct member connected to the outside opening portions.

8. The fuel cell stack according to claim 7, further comprising:
an inside opening portion provided on the inner plate of the upper panel to connect the flow passage and the interior of the stack casing,
wherein the inside opening portion is located closer to a center of the stack body than at least one of the outside opening portions.

9. The fuel cell stack according to claim 4, wherein the inside opening portion overlaps with the stack body when viewed in the height direction.

10. The fuel cell stack according to claim 1, further comprising an inside opening portion through which the flow passage communicates with the interior of the stack casing,
wherein the inside opening portion overlaps with the stack body when viewed in the height direction.

11. The fuel cell stack according to claim 8, wherein the inside opening portion overlaps with the stack body when viewed in the height direction.

12. The fuel cell stack according to claim 5, further comprising an inside opening portion through which the flow passage communicates with the interior of the stack casing,
wherein the inside opening portion overlaps with the stack body when viewed in the height direction.

* * * * *